(12) United States Patent
An et al.

(10) Patent No.: US 7,514,170 B2
(45) Date of Patent: Apr. 7, 2009

(54) FUEL CELL SYSTEM

(75) Inventors: Seong-Jin An, Suwon-si (KR); Ho-Jin Kweon, Suwon-si (KR); Hyoung-Juhn Kim, Suwon-si (KR); Ju-Yong Kim, Suwon-si (KR); Yeong-Chan Eun, Suwon-si (KR); Sung-Yong Cho, Suwon-si (KR); Dong-Hun Lee, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 698 days.

(21) Appl. No.: 11/041,986

(22) Filed: Jan. 26, 2005

(65) Prior Publication Data

US 2005/0164061 A1  Jul. 28, 2005

(30) Foreign Application Priority Data

Jan. 28, 2004  (KR)  ............ 10-2004-0005359

(51) Int. Cl.
*H01M 8/04* (2006.01)
*H01M 8/02* (2006.01)

(52) U.S. Cl. .................................. 429/26
(58) Field of Classification Search ........... 429/26
See application file for complete search history.

(56) References Cited

U.S. PATENT DOCUMENTS

| | | | | |
|---|---|---|---|---|
| 2,913,511 A | * | 11/1959 | Grubb, Jr. | 429/30 |
| 3,061,658 A | * | 10/1962 | Blackmer | 429/26 |
| 4,517,259 A | * | 5/1985 | Lance | 429/26 |
| 5,776,624 A | * | 7/1998 | Neutzler | 429/26 |
| 6,800,385 B2 | * | 10/2004 | Harth | 429/13 |

FOREIGN PATENT DOCUMENTS

| | | | |
|---|---|---|---|
| CA | 2 424 172 | | 1/2004 |
| JP | 57084575 A | * | 5/1982 |
| JP | 58-178964 | | 10/1983 |
| JP | JN60-254568 | | 12/1985 |
| JP | 61157269 U | * | 9/1986 |
| JP | 02-106880 | | 4/1990 |
| JP | 04-286869 | | 10/1992 |
| JP | 10284105 A | * | 10/1998 |
| JP | 2003-048701 | | 2/2003 |
| JP | 2003-223244 | | 8/2003 |
| JP | 2003-229148 | | 8/2003 |

OTHER PUBLICATIONS

"Fuel Cell Handbook" 5th ed. EG&G Services, Parsonsm Inc. US Dept. of Energy, Oct. 2000, pp. 1-30 and 1-31.*

(Continued)

*Primary Examiner*—Gregg Cantelmo
(74) *Attorney, Agent, or Firm*—Robert E. Bushnell, Esq.

(57) ABSTRACT

A fuel cell system includes a stack having an electricity generator for receiving fuel and air to generate electrical energy, a fuel supply unit for supplying the fuel to the stack, a housing in which the stack is mounted, a fan unit for supplying external air to the interior of the housing for cooling the electricity generator, and a region wherein air heated while cooling the electricity generator and air discharged from the stack and containing moisture are mixed. The air that is mixed in the region is discharged from the region.

20 Claims, 6 Drawing Sheets

OTHER PUBLICATIONS

"Fuel Cell Handbook" 5th ed. EG&G Services, Parsonsm Inc. US Dept. of Energy, Oct. 2000, pp. 3-1, 3-12 and 3-13.*

Japanese Office Action dated Jul. 22, 2008, of the corresponding Japanese Patent Application No. 2005-014613.

* cited by examiner

FUEL CELL SYSTEM

CLAIM OF PRIORITY

This application makes reference to, incorporates the same herein, and claims all benefits accruing under 35 U.S.C. §119 from an application for FUEL CELL SYSTEM earlier filed in the Korean Intellectual Property Office on 28 Jan. 2004 and there duly assigned Serial No. 10-2004-0005359.

BACKGROUND OF THE INVENTION

1. Technical Field

The present invention relates to a fuel cell system and, more particularly, to the structure of a fuel cell system that facilitates cooling of a stack of the fuel cell system.

2. Description of the Related Art

A fuel cell is a system for producing electric power. In a fuel cell, energy resulting from a chemical reaction between oxygen and hydrogen contained in hydrocarbon-group materials, such as methanol, ethanol, and natural gas, is directly converted into electric energy. A unique characteristic of the fuel cell is that both the electricity generated by the electrochemical reaction between fuel and an oxidizing agent (without involving a combustion process) and its by-product heat may be utilized.

Depending on the type of electrolyte used, a fuel cell is classified into different types as follows: a phosphate fuel cell operating in a range of approximately 150~200° C.; a molten carbonate fuel cell operating in a range of approximately 600~700° C.; a solid oxide fuel cell operating at 1000° C. and above; and a polymer electrolyte or alkali fuel cell operating in a range between room temperature and 100° C. Although each of these different types of fuel cells operates using the same principles, they differ in the type of fuel, catalyst and electrolyte used, as well as in their drive temperature.

A polymer electrolyte membrane fuel cell (PEMFC) is presently undergoing development. Compared to other fuel cells, the PEMFC has excellent output characteristics, a low operating temperature, and fast starting and response characteristics. The PEMFC has a wide range of applications, including use in vehicles through utilization of hydrogen made by reforming methanol, natural gas, etc., use in the home and in buildings, and use as a power source in electronic devices.

The basic components of the PEMFC include a stack, a reformer, a fuel tank, and a fuel pump. The stack forms the main body of the fuel cell. The fuel pump supplies fuel in the fuel tank to the reformer. The reformer reforms the fuel during the process of supplying the fuel stored in the fuel tank to the stack, thereby generating hydrogen gas, and then supplies the hydrogen gas to the stack. Accordingly, the PEMFC sends the fuel in the fuel tank to the reformer by operation of the fuel pump, the reformer reforms the fuel to generate hydrogen gas, and the hydrogen gas undergoes an electrochemical reaction with oxygen in the stack, thereby generating electric energy.

Another type of fuel cell is the direct methanol fuel cell (DMFC). The DMFC differs from the PEMFC in that liquid methanol is directly supplied to the stack using this method such that there is no need for a reformer.

In the above fuel cell systems, the stack (where the generation of electricity takes place) is structured so as to include a few to a few tens of unit cells, each comprising a membrane electrode assembly (MEA) and separators (or bipolar plates) provided on both sides thereof. In the MEA, an anode electrode (also referred to as a "fuel pole" or "oxidation electrode") and a cathode electrode (also referred to as an "air pole" or "reduction electrode") are provided in opposition to one another with an electrolyte layer interposed therebetween. The separator functions to provide a pathway through which hydrogen gas and oxygen, which are required for fuel cell reaction, are supplied to the anode electrode and the cathode electrode of the MEA. In addition, the separator functions as a conductor for connecting the anode electrode and cathode electrode of each MEA in series. Accordingly, fuel gas containing hydrogen is supplied to the anode electrode, and oxygen gas containing oxygen is supplied to the cathode electrode via the separator. Through this process, electrochemical oxidation of the fuel gas occurs in the anode electrode, and electrochemical reduction of the oxygen gas occurs in the cathode electrode. Electricity is generated by the movement of electrons which occurs during this process. Heat and moisture are also generated.

In the above fuel cell systems, the stack must be constantly maintained at a suitable temperature in order to ensure stability of the electrolyte layer, as well as to prevent a reduction in overall performance. To realize this, an air-cooling type cooling apparatus is typically used in such a system to cool the stack by blowing air of a relatively low temperature thereon, and then exhausting the resulting heated air.

However, a drawback of the fuel cell system having the air-cooled type cooling structure, as described above, is that the air that is heated by passing through the stack is simply discarded. This is a significant waste of energy.

In addition, only part of the air supplied to the cathode electrode of the MEA through the separator for electricity generation of the stack is reacted, while the rest of this air is unreacted and exhausted in a state containing a large amount of moisture. When this air containing a large amount of moisture is exhausted from the stack to the atmosphere of a relatively low temperature, condensation is generated through contact with the atmosphere. Therefore, additional devices are required to store or re-use the water generated through this process. This increases the size of the system. If the additional device requires operation, heat is generated through this process and electricity consumed, thereby reducing the overall efficiency and performance of the fuel cell system.

SUMMARY OF THE INVENTION

In one exemplary embodiment of the present invention, there is provided a fuel cell system which has an overall compact structure, and which mixes air heated while cooling a stack with unreacted air exhausted through the stack such that the unreacted air is exhausted in a vaporized and non-condensed state, thereby enhancing system efficiency and performance.

In an exemplary embodiment of the present invention, the fuel cell system includes: a stack having an electricity generator for receiving fuel and air so as to generate electrical energy; a fuel supply unit for supplying the fuel to the stack; a housing in which the stack is mounted; a fan unit for supplying external air flow to the interior of the housing for the purpose of cooling the electricity generator; and a region where air heated while cooling the electricity generator, and air discharged from the stack and containing moisture, are mixed. The air that is mixed in the region is discharged from the region.

The housing includes a body in which the stack is mounted and to which the fan unit is connected, and a mixing unit extending integrally from the body to realize the region and having an exhaust hole through which the vaporized air is discharged to the exterior of the housing.

The fan unit includes a fan connected to the body through a fan line to thereby supply external air to the interior of the body. Alternatively, the fan unit includes a fan mounted to one side of the body.

The mixing unit is funnel-shaped and has an inner diameter that gradually decreases in a direction toward the exhaust hole, and includes an intake hole through which air discharged from the stack enters the mixing unit, and the exhaust hole.

In another embodiment, the region includes a mixing tank provided separately from the housing and connected to the housing and the stack. The fuel cell system further includes a first return line connected to the housing and the mixing tank, and a second return line connected to the stack and the mixing tank.

The housing includes an intake hole formed in and through one side of the housing, through which intake hole external air supplied by the fan unit is supplied to the interior of the housing, and an exhaust hole formed in and through a side of the housing opposite to that side through which the intake hole is formed and through which the heated air is discharged to the exterior of the housing. The mixing tank includes a first inflow hole connected to the exhaust hole through a first return line, and a second inflow hole connected to the stack through a second return line.

In yet another embodiment, the region includes a mixing pipe provided separately from the housing, and connected to the housing and the stack. A first return line is connected to the housing and the mixing pipe, and a second return line is connected to the stack and the mixing pipe.

The housing includes an intake hole formed in and through one side of the housing, through which intake hole external air supplied by the fan unit is supplied to the interior of the housing, and an exhaust hole formed in and through a side of the housing opposite to that side through which the intake hole is formed and through which the heated air is discharged to the exterior of the housing.

The mixing pipe includes a first inflow hole connected to the exhaust hole through the first return line, and a second inflow hole connected to the stack through the second return line. The mixing pipe is a 3-way pipe.

A plurality of electricity generators are mounted in the housing, and the external air directed through cooling paths formed between the electricity generators. Each of the electricity generators includes a membrane-electrode assembly (MEA), and a pair of separators interposing the MEA closely contacting opposite sides of the MEA.

The cooling paths are formed on one side of each of the separators at areas corresponding to the cooling paths formed on an adjacent one of the separators. The cooling paths are formed by the combination of channels formed on contacting surfaces of each of the separators.

The fuel cell system further includes a reformer mounted between the stack and the fuel supply unit to reform fuel supplied from the fuel supply unit, thereby generating hydrogen gas.

The fuel cell system may be a polymer electrolyte membrane fuel cell type of system, or a direct methanol fuel cell type of system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
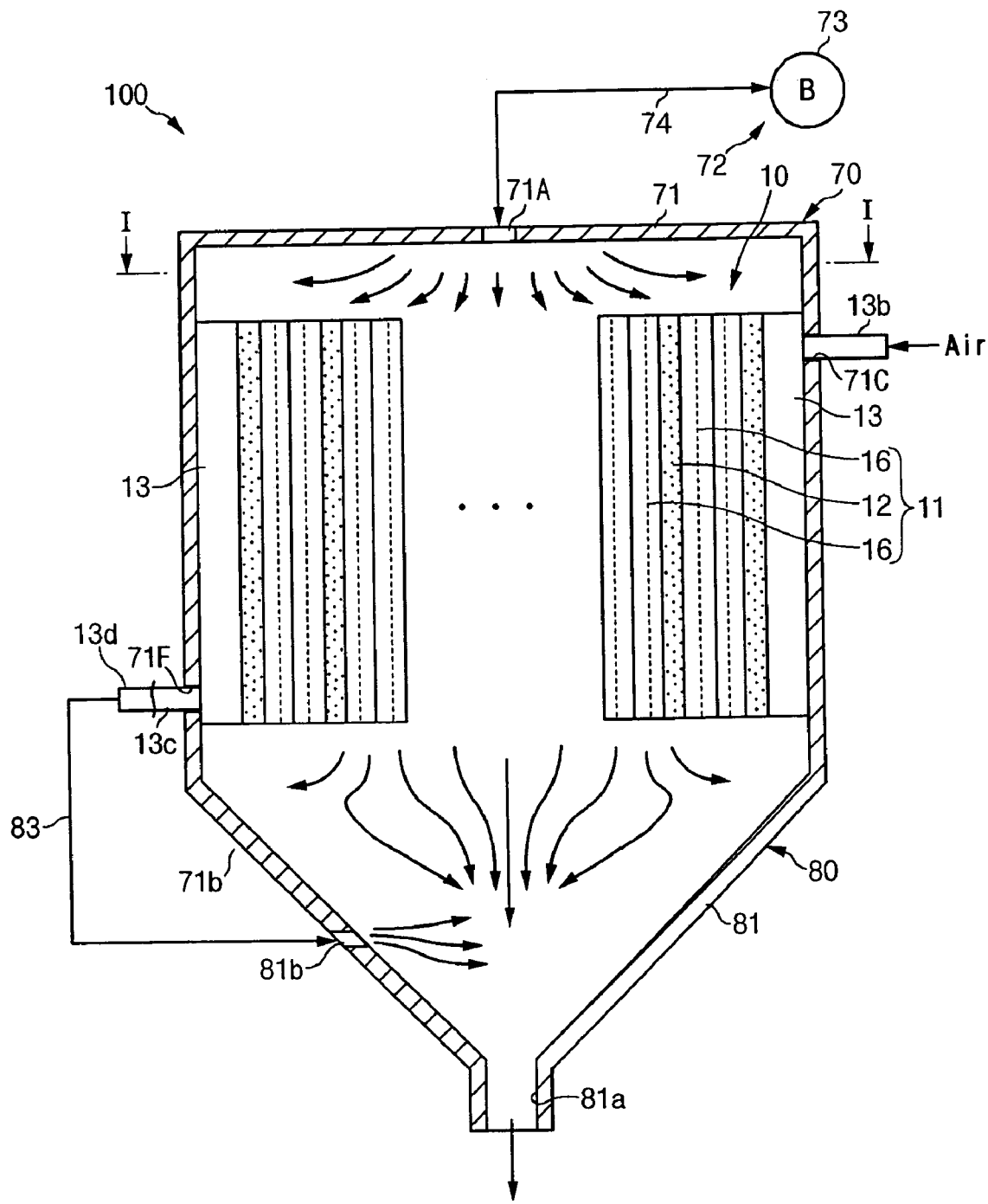
FIG. 1 is a schematic view of a fuel cell system according to a first exemplary embodiment of the present invention.
Figure 2:
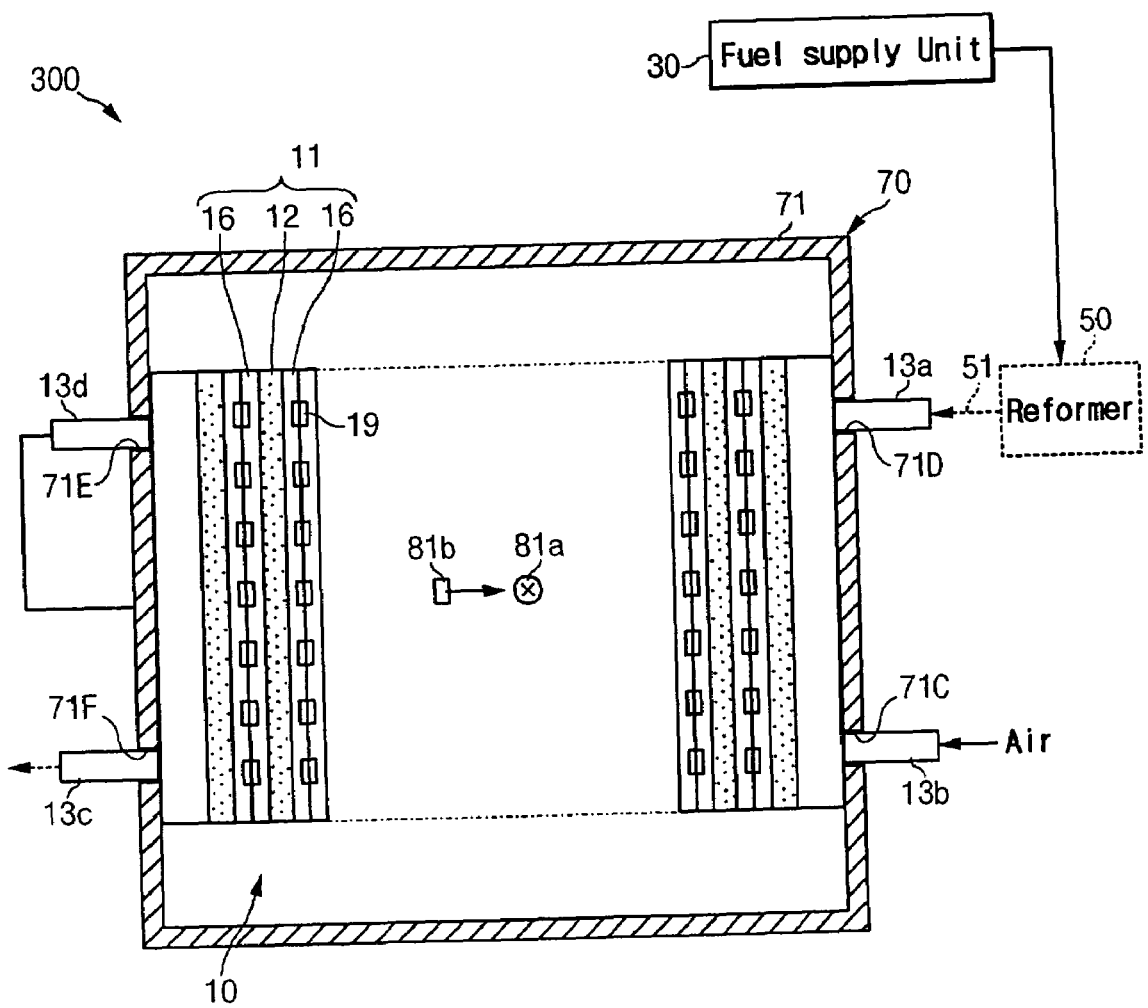
FIG. 2 is a sectional view taken along line I-I of FIG. 1.
Figure 3:
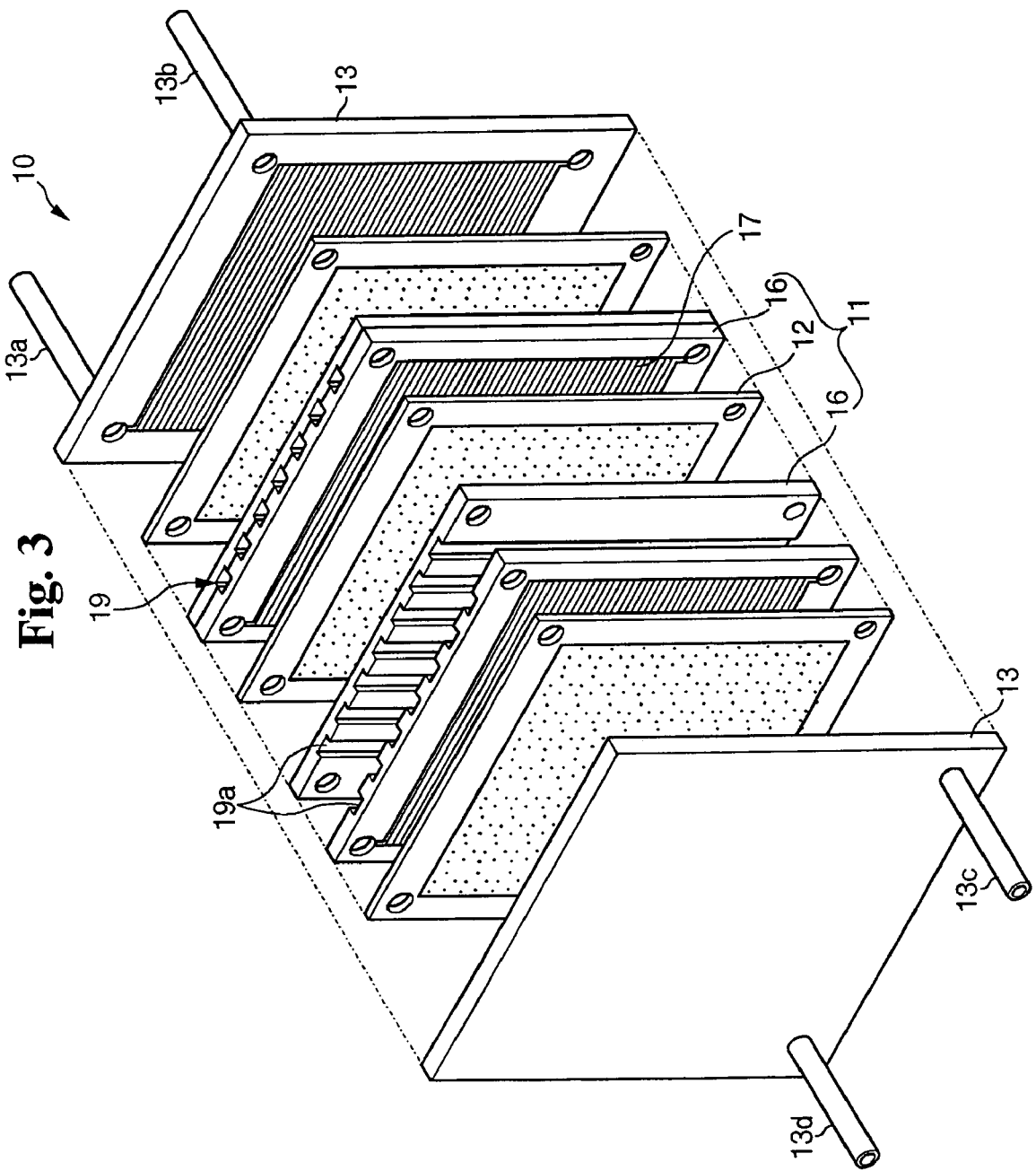
FIG. 3 is an exploded perspective view of a stack of a fuel cell system according to the present invention.

FIG. 1 is a schematic view of a fuel cell system according to a first exemplary embodiment of the present invention, FIG. 2 is a sectional view taken along line I-I of FIG. 1, and FIG. 3 is an exploded perspective view of a stack of a fuel cell system according to the present invention.

With reference to the drawings, a fuel cell system 100 according to the first exemplary embodiment of the present invention utilizes PEMFC technology in which a hydrocarbon-group fuel, such as methanol or natural gas, is reformed to generate a hydrogen gas, and an electrochemical reaction is effected between the hydrogen gas and oxygen in the air to thereby directly convert chemical energy into electrical energy. The present invention may also utilize DMFC technology in which liquid methanol fuel is directly supplied to a stack to generate electricity.

The fuel cell system 100 includes a stack 10 that receives fuel containing hydrogen and oxygen in air so as to generate electricity by an electrochemical reaction between the same, a fuel supply unit 30 for storing fuel and supplying the fuel to the stack 10, and a reformer 50 connected to the fuel supply unit 30 for reforming the fuel received from the fuel supply unit 30 so as to generate hydrogen gas.

The reformer 50 is of the type used in the conventional PEMFC, and therefore a detailed description of this element will not be provided.

The fuel supply unit 30 includes a fuel tank (not shown) for storing fuel containing hydrogen, and a fuel pump (not shown) for supplying the fuel stored in the fuel tank to the reformer 50 using a predetermined pumping force.

The stack 10 includes a plurality of electricity generators 11 that receive the hydrogen gas reformed through the reformer 50 and oxygen in air so as to induce an oxidation/reduction reaction between the same, ultimately generating electrical energy.

Each of the electricity generators 11 includes, as a main element for generating electricity, an MEA 12 which effects oxidation/reduction between hydrogen gas and oxygen gas, and separators 16 for supplying the hydrogen gas and oxygen gas to the MEA 12. A pair of the separators 16 interpose one of the MEAs 12. The stack 10 includes a plurality of the electricity generators 11 mounted adjacent to one another, and the outermost separators 16 in this assembly of the electricity generators 11 are referred to as end plates 13.

Each of the MEAs 12 has a structure in which an electrolyte layer is positioned between an anode electrode and a cathode electrode. The anode electrode includes a catalyst layer that converts hydrogen gas into electrons and hydrogen ions, and a support layer that allows for the smooth movement of the electrons and hydrogen ions. The cathode electrode includes a catalyst layer that converts oxygen gas into electrons and oxygen ions, and a support layer that allows for the smooth movement of the electorns and oxygen ions. The electrolyte layer is a solid polymer electrolyte of a thickness between 50 and 200 μm, and performs an ion exchange function of moving the hydrogen ions generated by the catalyst layer of the anode electrode to the catalyst layer of the cathode electrode.

The separators 16 act as conductors that connect in series the anode electrodes and the cathode electrodes of the MEAs 12. Further, the separators 16 act as paths through which hydrogen gas and oxygen gas, needed for the oxidation/reduction reaction of the MEAs 12, are supplied to the anode electrodes and the cathode electrodes. Each of the separators 16 includes flow channels 17 formed on a surface thereof for supplying reaction gas required for the oxidation/reduction reaction of the MEAs 12.

The separators 16 are provided in pairs interposing the MEAs 12 and closely contacting the anode electrodes and the cathode electrodes of the MEAs 12. Further, flow channels 17 for supplying hydrogen gas to the anode electrodes and oxygen gas to the cathode electrodes are formed on surfaces of the separators 16 contacting the anode electrodes and cathode electrodes of the MEAs 12.

Each of the end plates 13 presses against one of the anode electrode and the cathode electrode of the corresponding MEA 12. Flow channels 17 are formed in the pressing surfaces of the end plates 13 to thereby supply either hydrogen gas or oxygen gas to the electrodes which the end plates 13 are contacting.

Further, the end plates 13 include a first infusion pipe 13a for supplying hydrogen gas to one of the flow paths, a second infusion pipe 13b for supplying air to another one of the flow paths, a first discharge pipe 13c for exhausting hydrogen gas remaining unreacted in the electricity generators 11, and a second discharge pipe 13d for exhausting air remaining unreacted in the electricity generators 11. The first infusion pipe 13a is connected to the reformer 50 through a fuel supply line 51 for supplying generated hydrogen gas from the reformer 50 to the flow channels 17 of the end plates 13.

The stack 10 structured as described above generates electricity, heat, and water through the formulas of the following chemical reactions.

Anode reaction: $H_2 \rightarrow 2H^+ + 2e^-$
Cathode reaction: $\frac{1}{2}O_2 + 2H^+ + 2e^- \rightarrow H_2O$
Overall reaction: $H_2 + \frac{1}{2}O_2 \rightarrow H_2O + Current + Heat$ With reference to the reactions, hydrogen gas is supplied to the anode electrodes of the MEAs 12 and air is supplied to the anode electrodes of the MEAs 12 through the separators (or bipolar plates) 16. When the hydrogen gas flows to the anode electrodes, the hydrogen is resolved into electrons and protons (hydrogen ions) in the electrolyte layers. When the protons move through the electrolyte layers, electrons and oxygen ions and the moved protons combine in the cathode electrodes to generate water. The electrons generated in the anode electrodes are unable to pass through the electrolyte layers, and move to the cathode electrodes through an external circuit. Electricity and water are generated through this process.

During operation of the fuel cell system 100, heat is generated by the chemical reaction between hydrogen gas and oxygen gas. Further, in the stack 10, part of the air supplied to the cathode electrodes of the MEAs 12 through the separators 16 undergoes reaction for electricity generation, while the rest of the air is unreacted and exhausted through the second discharge pipe 13d in a state containing a large amount of moisture. As in the prior art, when this unreacted air is discharged to the atmosphere of a significantly lower temperature than the unreacted air, condensation is formed by the interaction between the unreacted air and the atmosphere.

A structure is provided in the fuel cell system 100 for cooling the heat generated in the stack 10 using external air, and for mixing the air heated during the cooling of the stack 10 with the unreacted air discharged from the second discharge pipe 13d such that the unreacted air does not condense and is, instead, discharged to the exterior of the fuel cell system 100 in a vaporized state.

That is, the fuel cell system 100 includes a housing 70 that forms a sealed space that encompasses the stack 10, a fan unit 72 that supplies external air to the interior of the housing 70 to reduce the heat generated by the stack 10, and a region 80 where heated air created while cooling the stack 10 is mixed with the unreacted air discharged from the stack 10.

The housing 70 is used to receive the stack 10 as described above, and includes a sealed container having an inner space of a predetermined volume. In the first exemplary embodiment, the housing 70 includes a body 71 forming the inner space. The body 71 may be formed as a rectangular parallelepiped.

The region 80 includes a mixing unit 81 integrally extending from the body 71. The mixing unit 81 has an exhaust opening 81a through which the mixed air is discharged to the exterior of the region 80 while being vaporized into steam, and an intake hole 81b through which air exhausted from the stack 10 is supplied to the mixing unit 81. In the first exemplary embodiment, the mixing unit 81 has an inner diameter that gradually decreases in a direction toward the exhaust opening 81a so as to be funnel-shaped.

An air intake hole 71A is formed on one side of the body 71. The air intake hole 71A is connected to the fan unit 72. Further, formed through side walls of the body 71 are a first connecting port 71C communicating with the second infusion pipe 13b of the stack 10, a second connecting port 71D communicating with the first infusion pipe 13a, a third connecting port 71E communicating with the second discharge pipe 13d, and a fourth connecting port 71F communicating with the first discharge pipe 13c.

The fan unit 72 is used to supply external air to the housing 70 during operation of the stack 10 to thereby cool the electricity generators 11. The fan unit 72 includes a fan 73 of a conventional structure for performing a suction function to supply external air to the housing, and a fan line 74 interconnecting the air intake hole 71A and the fan 73 to provide a path through which the air supplied by the fan 73 is directed to the interior of the housing 71.

Figure 4:
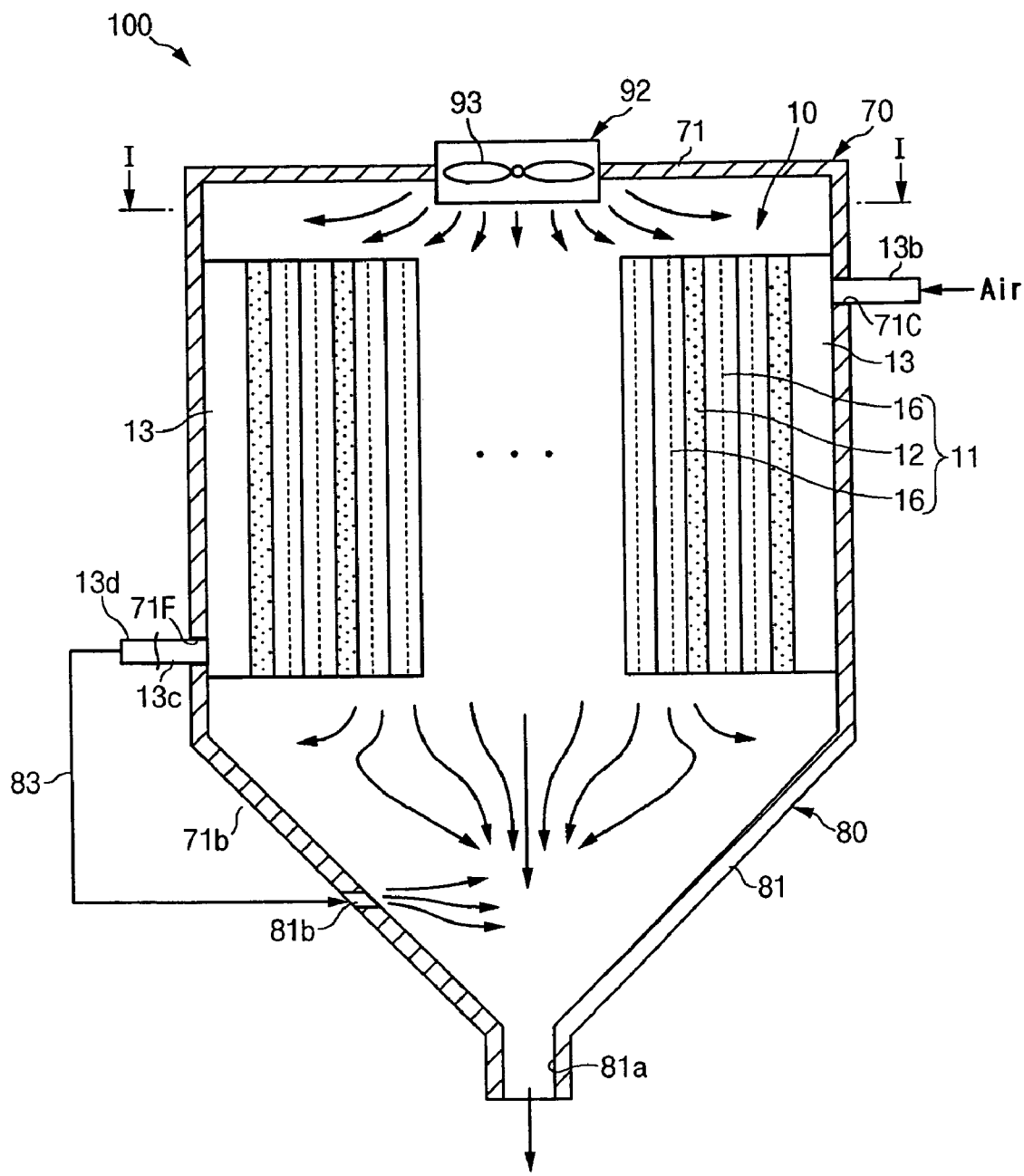
FIG. 4 is a schematic view of a fuel cell system according to a modified example of the first exemplary embodiment of the present invention.

In a modified example, with reference to FIG. 4, a fan unit 92 including a fan 93 is directly mounted to the body 71 without the use of a fan line.

Cooling paths 19 are formed between adjacent electricity generators 11 as best shown in FIG. 3. The cooling paths 19 allow for the passage of the external air between the electricity generators 11. Further, the cooling paths 19 are formed by channels 19a, which are formed in each of the separators 16 on surfaces of the same facing the separators 16 of adjacent electricity generators 11. That is, using two adjacent electricity generators 11 as an example, the surfaces of the separators 16 opposing one another are formed with the channels 19a at locations respectively corresponding to one another such that, when the separators 16 are abutted, pairs of opposing channels 19a form the cooling paths 19. The cooling paths 19 are provided in a direction corresponding to the flow direction of the external air (cooling medium). While the cooling paths 19 are shown in FIG. 3 as being formed vertically, the present invention is not limited in this respect.

The mixing unit 81 forms an area in which the air that is heated to a predetermined temperature through the process of cooling the electricity generators 11, and the unreacted air that is not fully reacted in the stack 10 and is discharged through the second discharge pipe 13d in a state containing a large amount of moisture, are mixed.

In the present invention, the reason why the heated air and the unreacted air are mixed in the mixing unit 81 is that, since there is a high possibility that air heated to approximately 30~40° C. while cooling the electricity generators will contain moisture (i.e., the dew point temperature has been reached), this heated air and the unreacted air containing large amounts of moisture discharged from the stack 10 are mixed, vaporized and discharged to the exterior of the mixing unit 81 in a vapor state. That is, the mixing unit 81 prevents a situation where the air discharged from the stack 10 in an unreacted state contacts the atmosphere and undergoes condensation.

The operation of the fuel cell system 100 structured as set forth above will now be described.

During the generation of electricity by operation of the stack 10, heat is generated in the electricity generators 11 by the chemical reaction between hydrogen gas and oxygen gas.

To reduce this heat, the fan 73 operates to supply air to the body 71 of the housing 70. As a result, external air passes through the cooling paths 19 of the electricity generators 11. The heat generated in the electricity generators 11 is reduced by the relatively cool external air passing through the cooling paths 19, and this external air is heated to a predetermined temperature through this operation.

The heated air is forced toward the mixing unit 81 by the air flow created by the fan 73. At the same time, the unreacted air discharged from the stack 10 is supplied to the interior of the mixing unit 81 via the second discharge pipe 13d, the intake hole 81b of the mixing unit 81, and a return line 83 interconnecting the second discharge pipe 13d and the intake hole 81b.

The heated air and the unreacted air are mixed in the mixing unit 81 through this process. As a result, the unreacted air does not undergo condensation as in the conventional system, and by the reaction with the heated air, the unreacted air is instead vaporized into a vapor state for output through the exhaust opening 81a of the mixing unit 81.

Hence, by such operation of the fuel cell system 100 of the present invention, electricity generation and cooling of the stack 10 are realized, and the air heated while cooling the stack 10 is mixed with unreacted air discharged from the stack 10 such that the generation of water by unreacted air is prevented.

Additional embodiments of the present invention will now be described.

Figure 5:
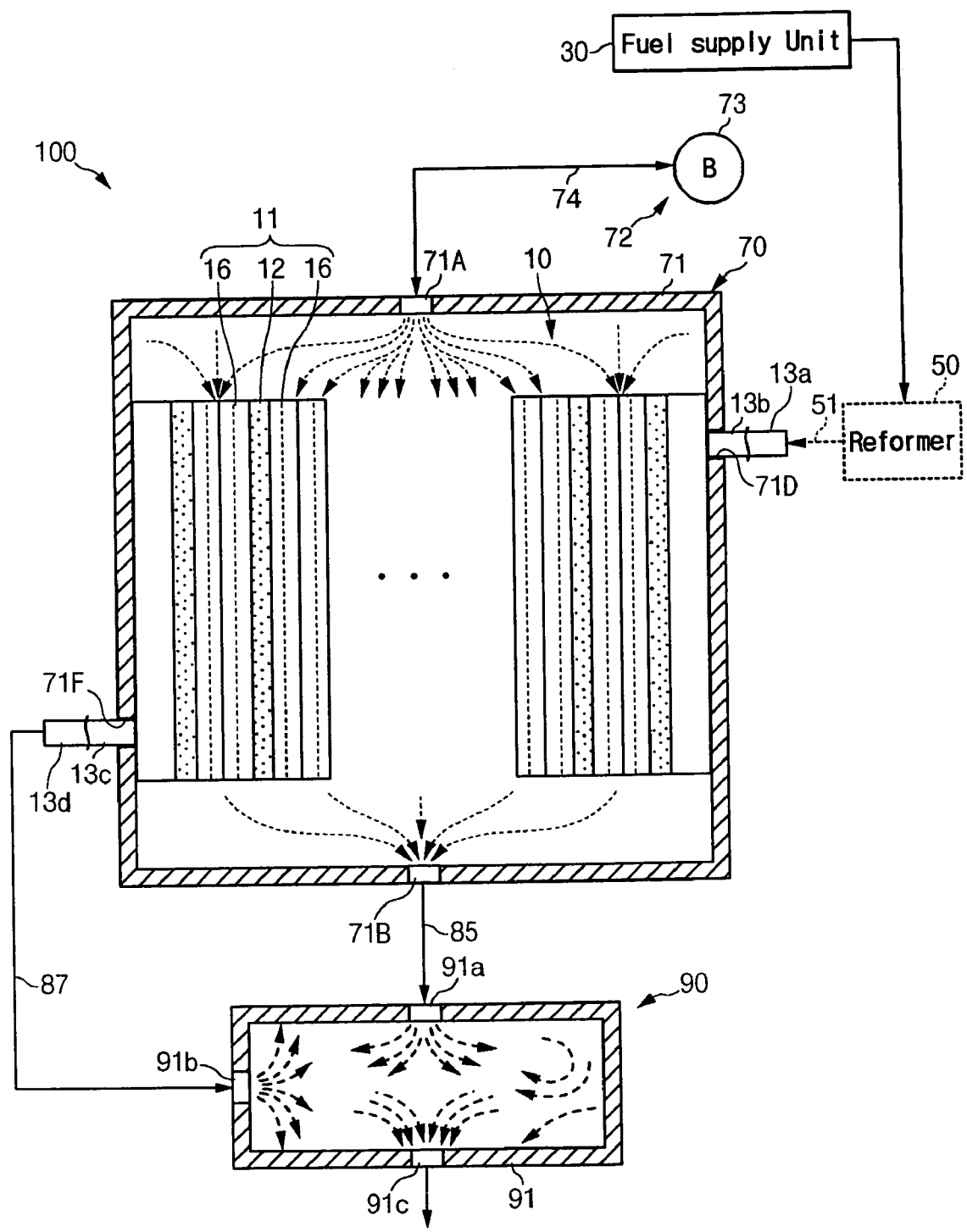
FIG. 5 is a schematic view of a fuel cell system according to a second exemplary embodiment of the present invention.
Figure 6:
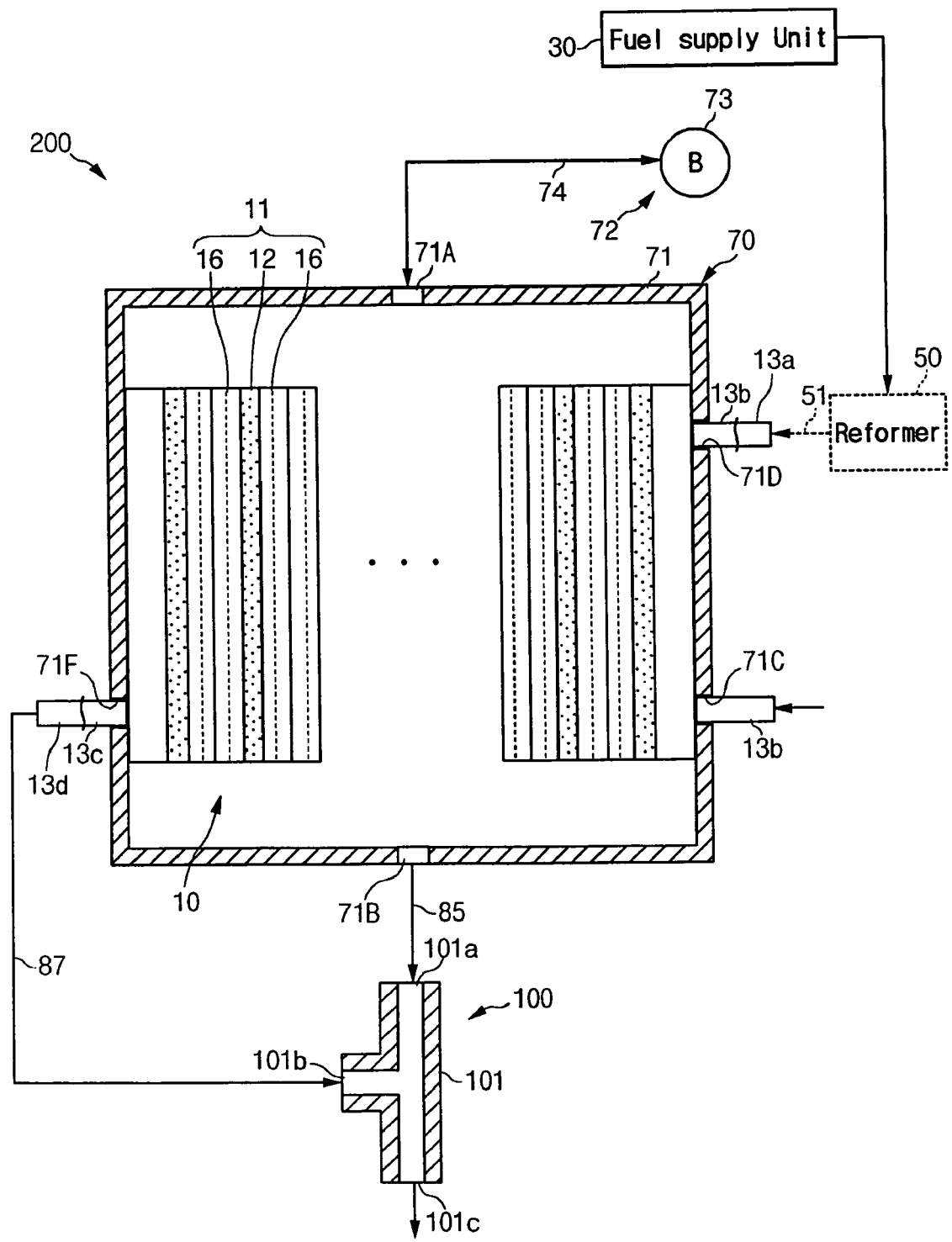
FIG. 6 is a schematic view of a fuel cell system according to a third exemplary embodiment of the present invention.

FIG. 5 is a schematic view of a fuel cell system according to a second exemplary embodiment of the present invention, and FIG. 6 is a schematic view of a fuel cell system according to a third exemplary embodiment of the present invention.

The basic structure of these embodiments is substantially the same as that of the first exemplary embodiment, differing only in construction with respect to the region where the mixed air is generated.

Referring first to FIG. 5, in the second exemplary embodiment, a region 90 is provided as a unit separate from the housing 70, and includes a mixing tank 91 connected to both the stack 10 mounted in the housing 70 and the housing 70 itself.

The mixing tank 91 is a sealed tank having an inner space of a predetermined volume. The mixing tank 91 is connected to the housing 70 through a first return line 85 such that hot air from the housing 70 may enter the mixing tank 91 via a first inflow hole 91a, and mixing tank 91 is connected to the stack 10 through a second return line 87 such that unreacted air from the stack 10 may enter the mixing tank 91 via a second inflow hole 91b. The heated air and the unreacted air are vaporized while being mixed, and this vaporized air is then output via an exhaust hole 91c formed in the mixing tank 91. The hot air in the housing 70 flows into the inner space of the mixing tank 91 through the first inflow hole 91a by operation of the air flow created by the fan unit 72.

In the first exemplary embodiment, with reference back to FIG. 1, when the air mixed in the mixing tank 81 is vaporized and discharged to the exterior of the mixing tank 81, the steam is able to be discharged through the exhaust opening 81a by the air flow created by the fan unit 72. In this embodiment, on the other hand, a pump (not shown) is mounted in the mixing tank 91 such that the steam is able to be discharged from the mixing tank 91 through the exhaust hole 91c.

The first return line 85 is connected to an air exhaust hole 71B formed through one side of the body 71 of the housing 70 (a side opposite the side through which the air intake hole 71A is formed), and, the first return line 85 is connected to the first inflow hole 91a of the mixing tank 91. The second return line 87 is connected to the second discharge pipe 13d of the stack 10 and to the second inflow hole 91b of the mixing tank 91.

In the fuel cell system 100 according to the third exemplary embodiment of the present invention, with reference to FIG. 6, a region 100 includes a mixing pipe 101 formed separately from the housing 70, and connected to the stack 10 within the housing 70 as well as to the housing 70 itself.

The mixing pipe 101 is formed as a 3-way pipe that allows for the inflow and outflow of a fluid through passageways separated at three locations. The mixing pipe 101 includes a first inflow hole 101a connected to the housing 70 through a first return line 85 such that hot air from the housing 70 is supplied to the interior of the mixing pipe 101, a second inflow hole 101b connected to the stack 10 through a second return line 87 such that unreacted air from the stack 10 is supplied to the interior of the mixing pipe 101, and an exhaust hole 101b through which the hot air and the unreacted air are discharged following mixing and vaporization.

The first return line 85 is connected to an air exhaust hole 72B formed through one side of the body 71 of the housing 70 (a side opposite the side through which the air intake hole 71A is formed), and to the first inflow hole 101a of the mixing pipe 101. The second return line 87 is connected to the second discharge pipe 13d of the stack 10 and to the second inflow hole 101b of the mixing pipe 101.

Except for the different configurations of the regions 90 and 100, all other aspects of the fuel cell systems of the second and third exemplary embodiments are identical to those of the first exemplary embodiment, including the operation thereof. Hence, a detailed description of the operation of the second and third exemplary embodiments will not be provided herein.

Using the fuel cell system according to the present invention described above, hot air generated while cooling the stack and unreacted air discharged from the stack are mixed such that the unreacted air is exhausted in a vaporized and non-condensed state. Therefore, there is no waste of thermal energy when cooling the stack.

Further, there is no need for a separate device for storing and re-using water generated by the condensation of unreacted air discharged from the stack. This reduces losses in thermal and electricity energy, thereby improving the efficiency and performance of the overall system.

Although embodiments of the present invention have been described in detail hereinabove in connection with certain exemplary embodiments, it should be understood that the invention is not limited to the disclosed exemplary embodiments but, on the contrary, this disclosure is intended to cover various modifications and/or equivalent arrangements included within the spirit and scope of the present invention, as defined in the appended claims.

What is claimed is:

1. A fuel cell system, comprising:
a stack having at least one electricity generator for receiving fuel and air to generate electrical energy;
a fuel supply unit for supplying the fuel to the stack;
a housing in which the stack is mounted, air discharged from the stack being exhausted out of the stack through a discharge pipe;
a fan unit for supplying external air to an interior of the housing for cooling said at least one electricity generator; and
a region being supplied with the air discharged from the stack through a return line that is coupled to the discharge pipe, wherein air heated while cooling said at least one electricity generator and the air discharged from the stack and containing moisture are mixed in the region;
wherein the air that is mixed in the region is discharged from the region.

2. The fuel cell system of claim 1, wherein the housing includes a body in which the stack is mounted and to which the fan unit is connected, and the region includes a mixing unit extending integrally from the body, the mixing unit having an exhaust hole through which the mixed air in the region is discharged to an exterior of the housing.

3. The fuel cell system of claim 2, wherein the fan unit includes a fan connected to the body through a fan line for supplying external air to an interior of the body.

4. The fuel cell system of claim 2, wherein the fan unit includes a fan mounted to one side of the body.

5. The fuel cell system of claim 2, wherein the mixing unit is funnel-shaped and has an inner diameter that gradually decreases while proceeding toward the exhaust hole, and the mixing unit includes an intake hole through which the air discharged from the stack enters the mixing unit.

6. The fuel cell system of claim 1, wherein the region includes a mixing tank provided separately from the housing and connected to the housing and the stack.

7. The fuel cell system of claim 6, further comprising a first return line connected to the housing and the mixing tank, and a second return line connected to the stack and the mixing tank.

8. The fuel cell system of claim 7, wherein the housing includes an intake hole formed in one side of the housing, and external air supplied by the fan unit is supplied to the interior of the housing through the intake hole, and the housing includes an exhaust hole formed in another side of the housing, and the heated air is discharged to an exterior of the housing through the exhaust hole.

9. The fuel cell system of claim 8, wherein the mixing tank includes a first inflow hole connected to the exhaust hole through the first return line, and a second inflow hole connected to the stack through the second return line.

10. The fuel cell system of claim 1, wherein the region includes a mixing pipe provided separately from the housing and connected to the housing and the stack.

11. The fuel cell system of claim 10, further comprising a first return line connected to the housing and the mixing pipe, and a second return line connected to the stack and the mixing pipe.

12. The fuel cell system of claim 10, wherein the housing includes an intake hole formed in one side of the housing, and external air supplied by the fan unit is supplied to the interior of the housing through the intake hole, and the housing includes an exhaust hole formed in another side of the housing, and the heated air is discharged to an exterior of the housing through the exhaust hole.

13. The fuel cell system of claim 12, wherein the mixing pipe includes a first inflow hole connected to the exhaust hole through the first return line, and a second inflow hole connected to the stack through the second return line.

14. The fuel cell system of claim 10, wherein the mixing pipe is a 3-way pipe.

15. The fuel cell system of claim 1, wherein said at least one electricity generator comprises a plurality of electricity generators mounted in the housing, and wherein the external air flows through cooling paths formed between the plurality of electricity generators.

16. The fuel cell system of claim 15, wherein each of the electricity generators includes a membrane-electrode assembly, and a pair of separators interposing the membrane-electrode assembly and closely contacting opposite sides of the membrane-electrode assembly; and
wherein the cooling paths are formed on one side of each of the separators at areas corresponding to the cooling paths formed on an adjacent one of the separators.

17. The fuel cell system of claim 16, wherein the cooling paths are formed by the combination of channels formed on contacting surfaces of each of the separators.

18. The fuel cell system of claim 1, further comprising a reformer mounted between the stack and the fuel supply unit for reforming fuel supplied from the fuel supply unit to thereby generate hydrogen gas.

19. The fuel cell system of claim 18, wherein the fuel cell system comprises a polymer electrolyte membrane fuel cell system.

20. The fuel cell system of claim 1, wherein the fuel cell system comprises a direct methanol fuel cell system.

* * * * *